US012143765B1

(12) United States Patent
Hyatt

(10) Patent No.: US 12,143,765 B1
(45) Date of Patent: Nov. 12, 2024

(54) VIBROACOUSTIC PLATFORM SYSTEM

(71) Applicant: Delton Hyatt, Chicago, IL (US)

(72) Inventor: Delton Hyatt, Chicago, IL (US)

( * ) Notice: Subject to any disclaimer, the term of this patent is extended or adjusted under 35 U.S.C. 154(b) by 0 days.

(21) Appl. No.: 18/593,879

(22) Filed: Mar. 2, 2024

(51) Int. Cl.
*H04R 1/22* (2006.01)

(52) U.S. Cl.
CPC .................................... *H04R 1/22* (2013.01)

(58) Field of Classification Search
CPC ........ H04R 7/10; H04R 1/22; H04R 2499/13; B06B 1/0292
See application file for complete search history.

(56) References Cited

U.S. PATENT DOCUMENTS

2012/0238915 A1 9/2012 Tien

FOREIGN PATENT DOCUMENTS

| | | | | |
|---|---|---|---|---|
| DE | 10145328 A1 * | 5/2002 | .............. G10K 9/20 |
| DE | 10201917 A1 | 7/2003 | |
| KR | 970011742 B1 | 7/1997 | |

* cited by examiner

*Primary Examiner* — Sunita Joshi
(74) *Attorney, Agent, or Firm* — Flener IP & Business Law; Zareefa B. Flener

(57) ABSTRACT

A system for acoustically exciting a platform includes one or more sheets of material, each sheet having upper and lower surfaces. An acoustic transducer is disposed on the lower surface of each sheet, wherein the acoustic transducer excites each sheet with vibrational energy. Three or more supports disposed extending from the lower surface of each sheet.

18 Claims, 2 Drawing Sheets

VIBROACOUSTIC PLATFORM SYSTEM

CROSS-REFERENCE TO RELATED APPLICATION

This application claims the benefit of U.S. Provisional Application No. 63/449,789, filed Mar. 3, 2023, the disclosure of which is incorporated by reference in its entirety.

FIELD OF THE INVENTION

The present invention relates to a system for acoustically exciting a platform. In particular the present invention relates to a system for acoustically exciting a platform supported to freely vibrate with a desired amplitude and frequency in response to excitation by an acoustic transducer.

BACKGROUND

It has been found that particular modes of sound or music delivered to an observer can produce a variety of effects, called vibroacoustic effects, in the observer's brain Such delivery can include vibrations delivered to the observer's body through a supporting surface, for example through a floor or through furniture disposed on the floor, and can be beneficial for the mental health of the observer. In particular, low frequency vibrations, typically between about 20 and about 250 Hz and having sufficient amplitude to generate significant tactile appreciation, have been shown to improve or slow the progression of Parkinson's and other neurodegenerative diseases.

A need therefore exists for a platform for delivery to an observer of vibrations applied to the platform having controlled frequencies and amplitudes. It would be beneficial if the platform were supported to freely vibrate without dampening of the applied vibrations. It would be further beneficial if the platform was capable of supporting an observer so that rhythmic body movements and stretching of the observer could be incorporated into the vibroacoustic effects to produce enhanced vibroacoustic effects for the observer.

BRIEF SUMMARY OF THE INVENTION

In one aspect of the invention, a system for acoustically exciting a platform comprises one or more sheets of material, each sheet having upper and lower surfaces. An acoustic transducer is disposed on the lower surface of each sheet, wherein the acoustic transducer excites each sheet with vibrational energy. Three or more supports are disposed extending from the lower surface of each sheet.

In another aspect of the invention, a system for acoustically exciting a platform comprises one or more sheets of material, each sheet having upper and lower surfaces. An acoustic transducer is disposed on the lower surface of each sheet, wherein the acoustic transducer excites each sheet with vibrational energy. Three or more supports are disposed extending from the lower surface of each sheet. A control unit is configured to send a signal to each transducer, wherein the signal comprises an amplitude and a frequency of excitation for the transducer.

In a further aspect of the invention, a system for acoustically exciting a platform comprises one or more sheets of material, each sheet having upper and lower surfaces. An acoustic transducer is disposed on the lower surface of each sheet, wherein the acoustic transducer excites each sheet with vibrational energy. Three or more supports each comprising a spring are disposed extending from the lower surface of each sheet. A control unit is configured to send a signal to each transducer, wherein the signal comprises an amplitude and a frequency of excitation for the transducer.

DETAILED DESCRIPTION

The following detailed embodiments presented herein are for illustrative purposes. That is, these detailed embodiments are intended to be exemplary of the present invention for the purposes of providing and aiding a person skilled in the pertinent art to readily understand how to make and use of the present invention. While certain shapes and materials are used in some embodiments, they are by no means an intention of restriction.

Figure 1:
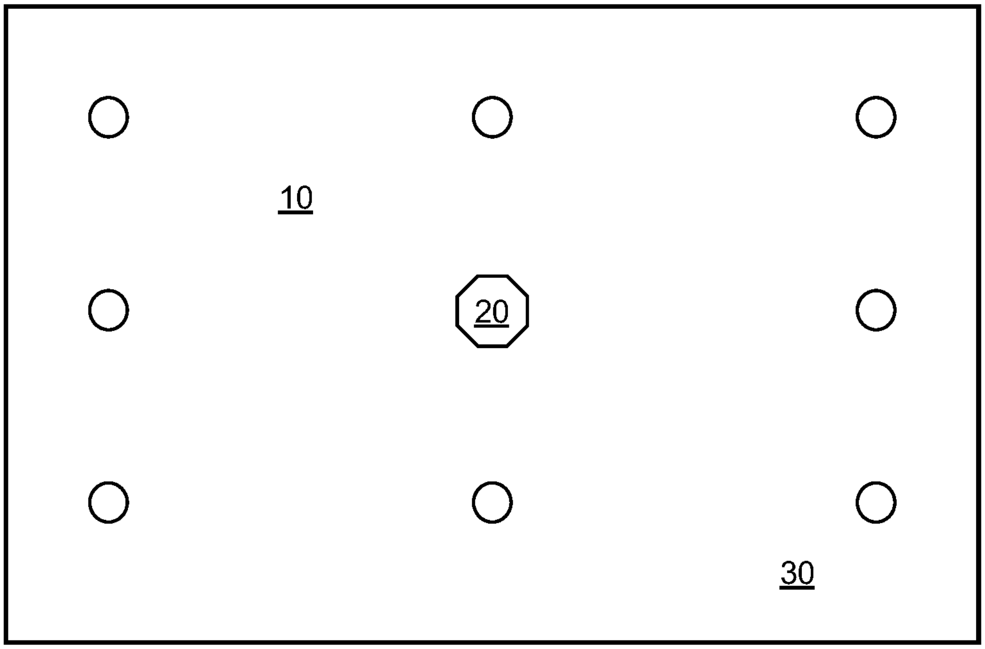
FIG. 1 is a schematic bottom view of a sheet of material according to an embodiment of the invention.
Figure 2:
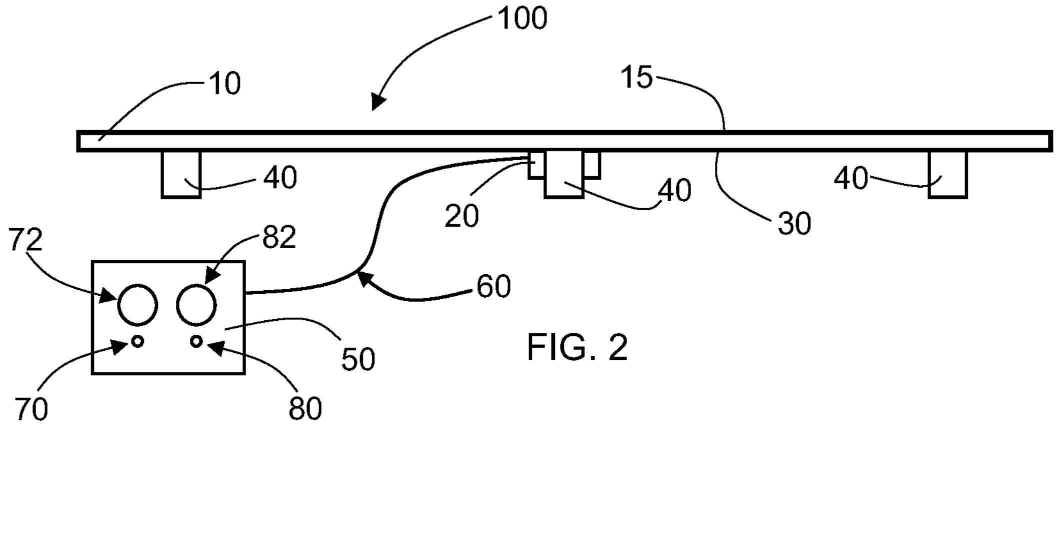
FIG. 2 is a schematic view of a system for acoustically exciting a platform according to an embodiment of the invention.

Referring to FIGS. 1 and 2, a system 100 for acoustically exciting a platform includes an exemplary sheet 10 of material, shown in a bottom plan view in FIG. 1, and having upper 15 and lower 30 surfaces. In an exemplary embodiment, an acoustic transducer 20 is disposed on a lower surface 30 of sheet 10. In an exemplary embodiment, acoustic transducer 20 excites sheet 10 with vibrational energy. In an exemplary embodiment, acoustic transducer 20 is a commercially available source for acoustic excitation, for example without limitation, a speaker, a sound source, or a transducer. In an exemplary embodiment, acoustic transducer 20 is attached to sheet 10 by an adhesive, by fasteners, or by any mechanism for attachment as is known in the art.

In an exemplary embodiment, the vibrational excitation provided by acoustic transducer 20 is a sinusoidal vibration. In a further exemplary embodiment, sheet 10 is made from a material that is susceptible to vibrating in response to excitation from acoustic transducer 20. In this exemplary embodiment, sheet 20 responds to the vibrational excitation provided by transducer 20 by vibrating in a sinusoidal mode wherein the maximum amplitude of vibration follows a sinusoidal curve. In an exemplary embodiment, sheet 10 is made from a material, for example without limitation, including solid wood, plywood, sheet metal, or any material that can be formed into a sheet and suitable for vibrational excitation as disclosed herein.

In an exemplary embodiment, three or more supports 40 are disposed extending from lower surface 30 of each sheet 10. In an exemplary embodiment, each of the supports 40 comprises a spring, for example a coil spring. In an exemplary embodiment, each of the coil springs 40 is made from a coil of wire and provides a resilient support for sheet 10 via torsional resistance in the wire. Without being held to theory, the spring constants of springs 40 and the distribution of springs 40 along lower surface 30 of sheet 10 are designed to accommodate the combined weight of sheet 10 and any human beings present on sheet 10 at an approximate distribution of about 16 $ft^2$ per human. Further, the design parameters for the thickness of sheet 10, the material making up sheet 10, the stiffness of sheet 10, and the size, thickness, spring constant and distribution of springs 40, are selected to allow sheet 10 to freely vibrate at the frequency of excitation of acoustic transducer 20, while preventing or minimizing the formation of first and second order harmonic vibrations of sheet 10 below about 20 Hz and above about 250 Hz. Minimizing the formation of the first and second order harmonics of sheet 10 at frequencies outside of the desired range of frequencies prevents undesirable noise, vibration, or potential resonance induced damage to sheet 10.

In an exemplary embodiment, a control unit 50 is disposed in communication with each transducer 20. In an exemplary embodiment, control unit 50 communicates with each transducer 20 via a wire or wires 60. Each of the transducers 20 also requires power to operate, and so can also be connected to a source of power via a wired connection (not shown). In an exemplary embodiment, control unit 50 communicates with each transducer 20 via a wireless connection. In other embodiments, control unit 50 communicates with one or more of the transducers 20 with a wired connection and communicates with one or more of the transducers 20 with a wireless connection. In an exemplary embodiment, control unit 50 is configured to send an electrical signal to each transducer 20. For example, in an exemplary embodiment the electrical signal sent by control unit 50 comprises an excitation amplitude and an excitation frequency for transducer 20.

FIG. 2 schematically shows an exemplary control unit 50 including a control knob 70 and a display 72 for amplitude, and a control knob 80 and a display 82 for frequency. In other embodiments, the actual configuration of control unit 50 can include other types of user interface including slide switches, an alphanumerical keyboard, and the like. The control unit in an exemplary embodiment also includes a display for signals received from sheet 10, for example without limitation, from a waveform sensor (not shown) disposed on sheet 10, for the display of the actual frequency and amplitude of vibration of sheet 10.

In an exemplary embodiment, the acoustic excitation frequency set on control unit 50 and delivered to transducer 20 is the frequency at which transducer 20 operates. Without being held to theory, in this embodiment sheet 10 can vibrate at the set frequency or at a slightly different frequency because of the physical geometry of sheet 10 and other factors. However, in another embodiment, control unit 50 is calibrated so that the acoustic excitation frequency set on control unit 50 is the frequency at which sheet 10 vibrates, taking into account any variations with the vibrational frequency of transducer 20. In an exemplary embodiment, transducer 20 excites sheet 10 with vibrational energy so that sheet 10 vibrates in a range from about 20 Hz to about 250 Hz. In an exemplary embodiment, transducer 20 excites sheet 10 with vibrational energy so that sheet 10 vibrates at about 40 Hz. Without being held to theory, 40 Hz is considered to be the most beneficial frequency for vibroacoustic therapy related to several diseases, including without limitation, Alzheimer's, Parkinson's, and post-traumatic stress disorder (PTSD).

In an exemplary embodiment, the amplitude set on control unit 50 is simply a setting from minimum to maximum, for example, a low setting of 1 and a high setting of 10. In an exemplary embodiment, the amplitude set on control unit 50 is calibrated to indicate the actual maximum amplitude of vibration for sheet 10 based on the type of material used in sheet 10 and other factors. In an exemplary embodiment, acoustic transducer 20 excites sheet 10 with vibrational energy so that sheet 10 vibrates having a maximum amplitude in a range from about 0.001 mm to about 25 mm. In another exemplary embodiment, the maximum amplitude of vibration of sheet 10 can be less than 0.001 mm or greater than 25 mm. In an exemplary embodiment, the maximum amplitude of the vibration of sheet 10 is sufficient to accommodate what are known as camping factors, which include mats or rugs on sheet 10, and further provide sufficient amplitude when sensed through the camping factors to generate significant tactile appreciation for an observer positioned on sheet 10.

Figure 3:
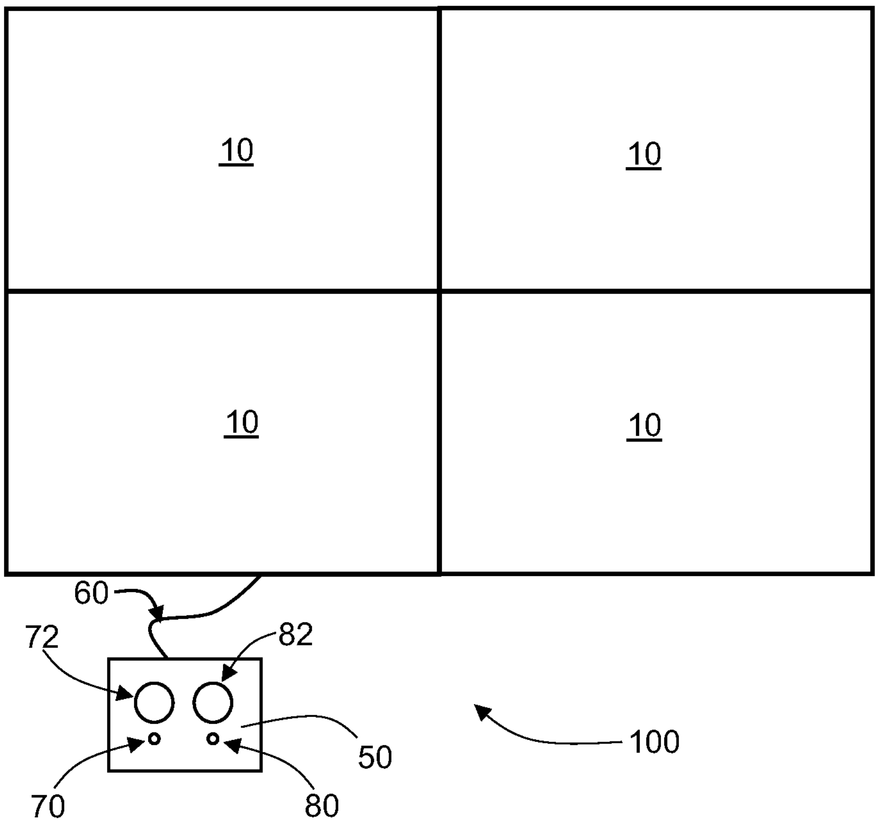
FIG. 3 is a schematic top plan view of a system for acoustically exciting a platform according to another embodiment of the invention.

Referring to FIG. 3, in an exemplary embodiment, system 100 comprises two or more of sheets 10 disposed adjacently when viewed looking at upper surfaces 15. It should be noted that although sheets 10 in FIGS. 1 and 3 are illustrated as rectangular that any shape as viewed from above can be used for any individual sheet 10. In an exemplary embodiment, having more than one sheet 10, a single control unit 50 controls all of the transducers 20. In another embodiment, having two or more of sheets 10 disposed adjacently there are multiple control units 50 each controlling one or more of the transducers 20.

In an exemplary embodiment, where multiple sheets 10 are combined to form a larger platform, adjacent edges of sheets 10 are lined up. In an exemplary embodiment, the lined up adjacent edges are left free from one another, with a small gap left therebetween. In an exemplary embodiment, the lined up adjacent edges are not attached but do touch one another. In another exemplary embodiment, the adjacent edges are physically attached to one another, for example without limitation, by an adhesive, an adhesively applied flexible sheet, or otherwise. Without being held to theory, in an exemplary embodiment the physical attachment of adjacent edges of multiple sheets 10 does not affect the frequency, amplitude, or modes of vibration of individual sheets 10.

INDUSTRIAL APPLICABILITY

A system for acoustically exciting a platform is provided. The system can be controlled to provide vibroacoustic therapy for patients suffering from a variety of diseases, including without limitation, Alzheimer's, Parkinson's, and post-traumatic stress disorder (PTSD). The system can be manufactured in industry for use by individuals and by professionals administering therapy to individuals.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

I claim:

1. A system for acoustically exciting a platform, the system comprising: one or more sheets of material, each sheet having upper and lower surfaces; an acoustic transducer disposed on the lower surface of each sheet, wherein the acoustic transducer excites each sheet with vibrational energy; and three or more supports disposed extending from the lower surface of each sheet; wherein each of the supports comprises a spring.

2. The system of claim 1, comprising two or more of the one or more sheets of material disposed adjacently when viewed looking at the upper surfaces.

3. The system of claim 1, wherein the acoustic transducer excites the one or more sheets of material with vibrational energy so that the one or more sheets of material vibrate in a range from about 20 Hz to about 250 Hz.

4. The system of claim 3, wherein the acoustic transducer excites each of the one or more sheets of material with vibrational energy so each of the one or more sheets of material vibrates having a maximum amplitude in a range from about 0.001 mm to about 25 mm.

5. The system of claim 1, wherein the one or more sheets of material are made from a material selected from the group consisting of solid wood, plywood, sheet metal, and combinations thereof.

6. The system of claim 1, further comprising a control unit configured to send a signal to the acoustic transducer, wherein the signal comprises an amplitude and a frequency of excitation for the acoustic transducer.

7. A system for acoustically exciting a platform, the system comprising: one or more sheets of material, each of the one or more sheets of material having upper and lower surfaces; an acoustic transducer disposed on the lower surface of each of the one or more sheets of material, wherein the acoustic transducer excites each of the one or more sheets of material with vibrational energy; three or more supports disposed extending from the lower surface of each of the one or more sheets of material; and a control unit configured to send a signal to the acoustic transducer, wherein the signal comprises an amplitude and a frequency of excitation for the acoustic transducer; wherein each of the supports comprises a spring.

8. The system of claim 7, wherein two or more of the one or more sheets of material are disposed adjacently when viewed looking at the upper surfaces.

9. The system of claim 7, wherein the acoustic transducer excites each of the one or more sheets of material with vibrational energy so that each of the one or more sheets of material vibrates in a range from about 20 Hz to about 250 Hz.

10. The system of claim 9, wherein the acoustic transducer excites each of the one or more sheets of material with vibrational energy so that the sheet vibrates at about 40 Hz.

11. The system of claim 9, wherein the acoustic transducer excites each of the one or more sheets of material with vibrational energy so that each of the one or more sheets of material vibrates having a maximum amplitude in a range from about 0.001 mm to about 25 mm.

12. The system of claim 7, wherein the one or more sheets of material are made from a material selected from the group consisting of solid wood, plywood, sheet metal, and combinations thereof.

13. A system for acoustically exciting a platform, the system comprising:

one or more sheets of material, each of the one or more sheets of material sheet having upper and lower surfaces;

an acoustic transducer disposed on the lower surface of each of the one or more sheets of material, wherein the acoustic transducer excites each of the one or more sheets of material with vibrational energy;

three or more supports each comprising a spring and disposed extending from the lower surface of each of the one or more sheets of material; and a control unit configured to send a signal to each acoustic transducer, wherein the signal comprises an amplitude and a frequency of excitation for the acoustic transducer.

14. The system of claim 13, wherein two or more of the one or more sheets of material are disposed adjacently when viewed looking at the upper surfaces.

15. The system of claim 13, wherein the acoustic transducer excites each of the one or more sheets of material with vibrational energy so that each of the one or more sheets of material vibrates in a range from about 20 Hz to about 250 Hz.

16. The system of claim 15, wherein the acoustic transducer excites each of the one or more sheets of material with vibrational energy so that each of the one or more sheets of material vibrates at about 40 Hz.

17. The system of claim 16, wherein the acoustic transducer excites each of the one or more sheets of material with vibrational energy so that each of the one or more sheets of material vibrates having a maximum amplitude in a range from about 0.001 mm to about 25 mm.

18. The system of claim 13, wherein the one or more sheets of material are made from a material selected from the group consisting of solid wood, plywood, sheet metal, and combinations thereof.

* * * * *